Oct. 28, 1958   R. A. COLE   2,857,727
ROTARY MOWER WITH SPECIFIC HOUSING
Filed March 12, 1956   3 Sheets-Sheet 1

INVENTOR.
RALPH A. COLE
BY
*Barnes, Kisselle, Laughlin & Raisch*
ATTORNEYS.

Oct. 28, 1958 R. A. COLE 2,857,727
ROTARY MOWER WITH SPECIFIC HOUSING
Filed March 12, 1956 3 Sheets-Sheet 3

INVENTOR.
RALPH A. COLE
BY
Barnes, Kisselle, Laughlin & Raisch
ATTORNEYS.

United States Patent Office
2,857,727
Patented Oct. 28, 1958

2,857,727
ROTARY MOWER WITH SPECIFIC HOUSING

Ralph A. Cole, Lansing, Mich., assignor to Motor Wheel Corporation, Lansing, Mich., a corporation of Michigan Application March 12, 1956, Serial No. 571,033

5 Claims. (Cl. 56—25.4)

This invention relates to lawn mowers and particularly to power lawn mowers of the rotary type for cutting grass and other vegetation.

Lawn mowers of the rotary type generally include a rotary blade mounted for rotation about a generally vertical axis with the plane of rotation horizontal. As the mower is moved along the ground, a swath is cut and the grass cuttings pile up in a windrow along the path of the mower. In addition, in cutting heavy grass or vegetation, there is a possibility that the grass cuttings will accumulate within the lawn mower housing and clog the housing preventing the efficient operation of the mower. The problem of clogging is present in rotary mowers of the bottom discharge type as well as the side wall discharge type.

It is an object of this invention to produce a lawn mower of the rotary type which will effectively cut and scatter the grass cuttings without forming windrows.

It is a further object of this invention to produce a rotary lawn mower which will cut through heavy grass or vegetation without any obstruction or interference with the efficient operation thereof and which is substantially free from clogging under normal and even heavy grass cutting operation.

Figure 1:
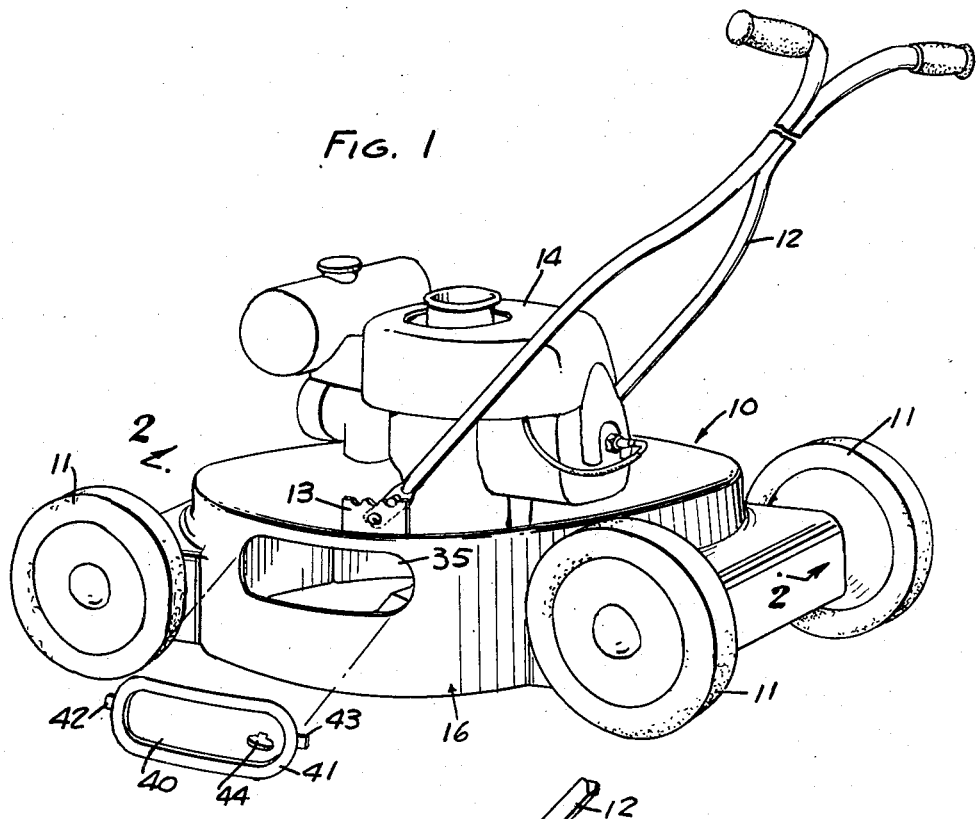
Fig. 1 is a perspective view of a lawn mower embodying the invention.

Referring to Fig. 1, the lawn mower comprises a housing 10 provided with wheels 11 whereby the housing may be rotatably supported for movement along the ground. A handle 12 is pivotally mounted on brackets 13 on the top of the housing 10. A power unit is mounted on the housing and may be either of the electric or gasoline type and, as shown in Fig. 1, comprises a gasoline engine 14.

Figure 2:
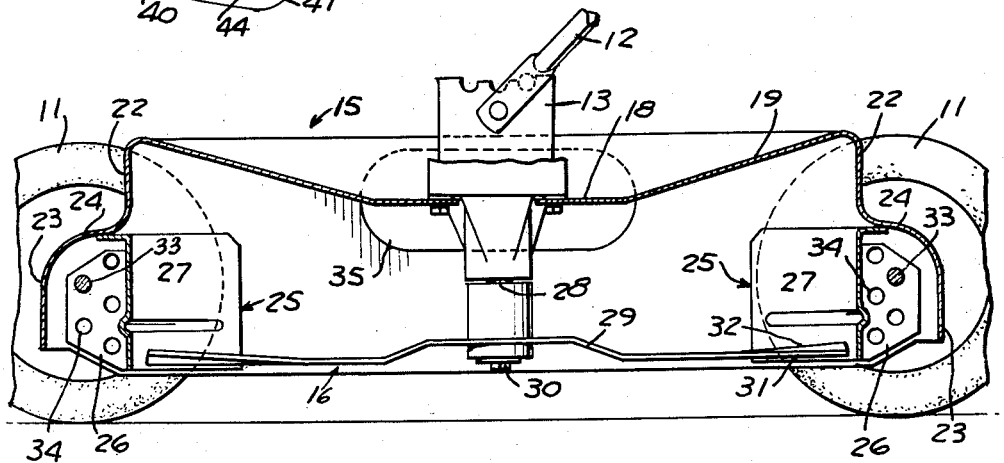
Fig. 2 is a sectional view taken along the line 2—2 in Fig. 1.
Figure 4:
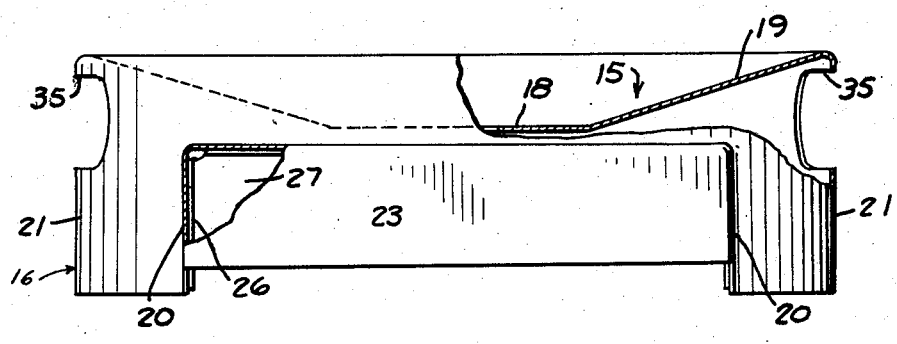
Fig. 4 is an end elevational view of the housing, parts being broken away and shown in section.

As shown in Figs. 2 and 4, housing 10, which by way of illustration is a metal stamping, has a top wall 15 comprising a central depressed flat portion 18 and a frusto-conical portion 19 which is inclined upwardly and outwardly away from the flat depressed portion 18. The housing 10 is provided with a pair of inserts 25 which cooperate with the housing to form an imperforate vertical cylindrical wall projecting downwardly from the periphery of frusto-conical portion 19 of top wall 15. Specifically, housing 10 includes arcuate side portions 21 and arcuate end portions 22 extending downwardly from the periphery of frusto-conical portion 19 of top wall 15 and having the same radius of curvature. Arcuate side portions 21 extend downwardly to the lower edge of the housing, whereas arcuate end portions 22 extend downwardly to the top edge of the inserts 25. The inserts 25 include arcuate portions 27 which have the same radius of curvature as the arcuate side portions 21 and arcuate end portions 22, and cooperate with these portions to form the imperforate vertical cylindrical wall. Housing 10 also includes extensions at each end thereof for mounting the wheels. These extensions comprise side sections 20, end sections 23 and horizontal sections 24. The inserts 25 include sections 26 lying along the side sections 20, and the inserts are fixed in position within the housing in any suitable manner, for example, by welding.

As shown in Fig. 2, the vertical shaft 28 of engine 14 projects downwardly within the housing, and rotary blade 29 is mounted on the lower end thereof, for example, by a bolt 30. Rotary blade 29 is provided with a cutting edge 31 and an impeller vane 32 at each end, whereby when the blade is rotated a positive pressure is created above the blade. The blade 29 is mounted within the housing in such a position that the plane of rotation of the blade is above and in close proximity to the lower edge of the housing.

The axles 33 which support the wheels pass through openings 34 in the side sections 20 of the side wall and sections 26 of insert 25. The cutting height of the mower may be adjusted by selectively positioning the axle in a particular pair of aligned openings 34 thereby changing the position of the housing and, in turn, the blade relative to the ground. End section 23 of the end wall projects downwardly a lesser distance than the arcuate portions 21 of side walls 16 and the arcuate portions 27 of inserts 25.

Figure 3:
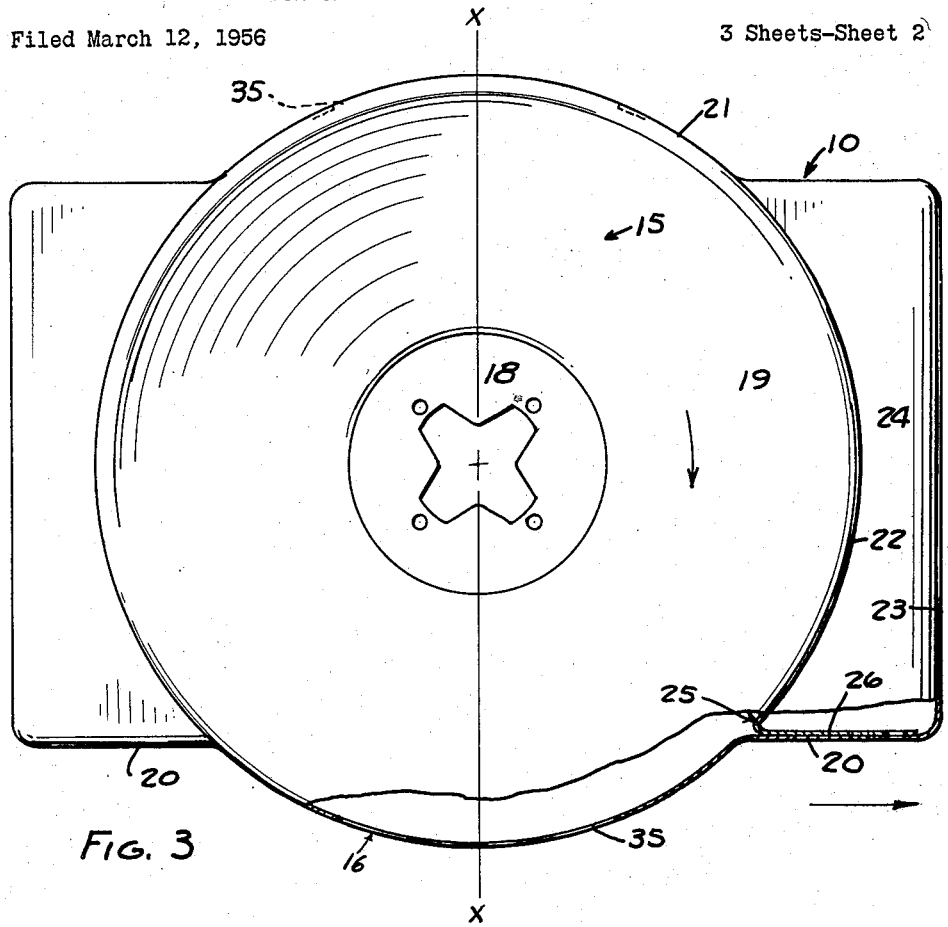
Fig. 3 is a plan view of the housing of the lawn mower, parts being broken away and shown in section.

Each of the side walls 16 is provided with a discharge opening 35 in the arcuate portion 21 thereof in an area above the plane of rotation of the blade 29 and in close proximity to the periphery of the top wall 15. As shown in Fig. 3, the openings 35 are positioned on opposite sides of the housing with the centers thereof lying on the transverse center line of the housing designated by the line x—x. The lawn mower is thus symmetrical about both the longitudinal and transverse center lines so that the mower can be operated in either direction with equal facility. The openings are generally rectangular with the long sides thereof parallel and the ends curved.

It can thus be seen that there is provided a substantially imperforate housing surrounding the plane of rotation of the blade including a vertical cylindrical wall and a top wall having portions tapered outwardly and upwardly away from the center thereof.

In operation with the engine running, the lawn mower is moved along the ground. A negative pressure is created below the blade by the fan-like operation of the blade which draws air in and around the lower peripheral edge of the cylindrical wall of the housing and forces the air upwardly and outwardly through the discharge openings 35, thus, tending to raise and erect the blades of grass or vegetation, bringing them into the path of rotation of the blade 29. The high speed rotation of the blade cuts the grass, and the grass cuttings are elevated by the air flow toward the top of the housing. At the same time, the grass cuttings have a centrifugal motion imparted thereto. After being cut, some of the cuttings are discharged out of the opening 35 which is on the side of the housing past which the end of the blade moves immediately after it has passed the forward end of the housing (forward in the sense of the direction in which the mower is moving). As shown in Fig. 3, if the lawn mower is moving forward in the direction of the arrow, shown in the lower right-hand corner, the cutting blade 29 will rotate in a clockwise direction, shown by the arrow, and some of the cuttings will be discharged from opening 35, positioned on the right side of the housing. Cuttings which are not discharged through the opening are free to travel around the interior of the housing and mostly all are discharged through the second discharge opening 35 which is on the left side of the housing. The cuttings are carried out through the openings by the normal upward and outward movement of the air through the openings.

The design of the housing allows the cuttings to flow upwardly and outwardly toward the discharge ports 35. Since there is no obstacle to deflect the cuttings from their natural path, that portion of the cuttings which is not discharged through the one discharge opening continues in a circular path and escapes from the housing through the other discharge opening. Since the movement of the cuttings is not directed or channelled in any way, the cuttings are discharged from the discharge openings in a random pattern and therefore do not fall on the ground in a window. The cuttings are discharged from the housing without tending to accumulate in or clog the housing or discharge ports so that the operation of the mower is not interrupted or interfered with. The provision of the discharge openings with their centers on the transverse center line of the housing permits some of the cuttings to recirculate within the housing until they are carried out by the air stream flowing through the discharge openings. This continued recirculation permits some of the grass to be cut even more finely.

The mower may be operated with equally effective results in either direction, since the housing is symmetrical.

The operation of the mower is safe inasmuch as there are no openings near the ground through which the foot or hand of the operator might accidentally pass into the path of the moving blade.

The mower may be used for mulching leaves and the like by providing a cover 40 over each of the openings 35 (Fig. 1). Cover 40 is provided with a peripheral rim 41, fixed latch 42, and rotatable latch 43, the latter being actuated by a small knob 44. The cover is placed over the opening with the fixed latch 42 behind the peripheral wall and the knob 44 is rotated to bring the latch 43 behind the peripheral wall. When the mower is used with the covers in place, the leaves or other vegetation which are to be mulched are raised or elevated by the pressure differential between the top and bottom of the blade and successively cut, the leaves being repeatedly elevated and cut until they are of such a fineness that they will settle to the ground.

Figure 5:
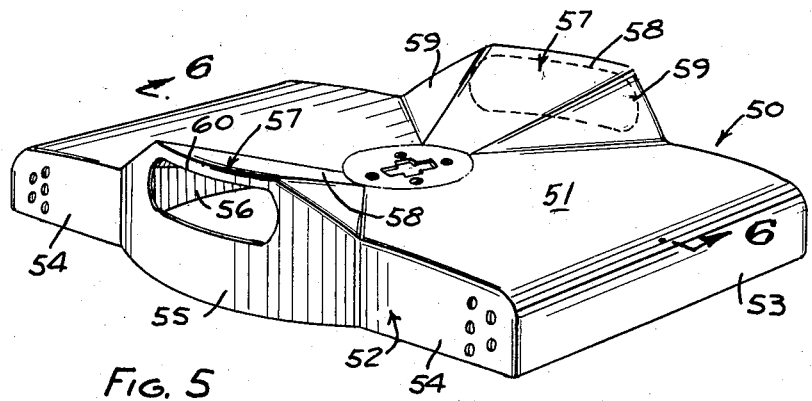
Fig. 5 is a perspective view of a modified form of the housing.
Figure 6:
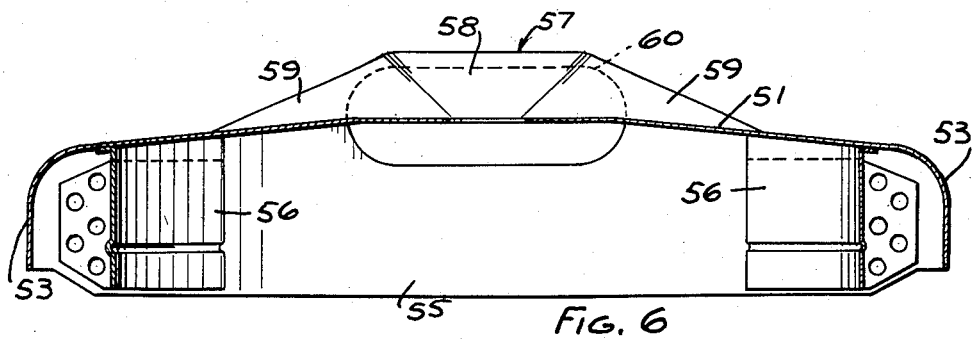
Fig. 6 is a sectional view taken along the line 6—6 in Fig. 5.
Figure 7:
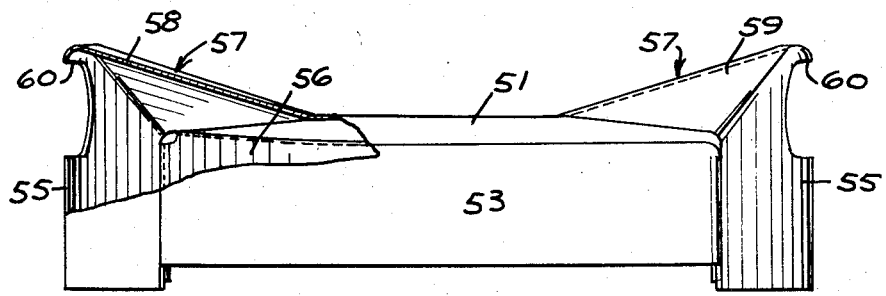
Fig. 7 is an end elevational view of the form of the housing shown in Fig. 5, parts being broken away and shown in section.

A modified form of the housing is shown in Figs. 5, 6 and 7. The housing 50 comprises a top wall 51, side walls 52 and end walls 53. As shown in Figs. 6 and 7, the top wall is generally flat and has a slight slope from the center downwardly and outwardly toward each side of the housing (Fig. 7). Each side wall 52 comprises longitudinally extending planar end portions 54 and an intermediate arcuate portion 55. Arcuate inserts 56 mounted within the housing cooperate with arcuate portions 55 to provide an imperforate vertical cylindrical wall surrounding the rotary blade 29. Inserts 56 are welded to the housing and abut against the top wall 51 to form the imperforate vertical cylindrical wall.

Diametrically opposed portions 57 on the transverse center line of top wall 51 are elevated outwardly and upwardly from the center of top wall 51. Each of the elevated portions 57 includes a substantially flat section 58 extending upwardly and outwardly from the center of top wall 51 and inclined sections 59 extending from the edge of said flat section 58 downwardly to the plane of top wall 51. Each inclined section 59 forms a small acute angle with the substantially horizontal plane of top wall 51. By way of illustration, the angle is of the order of 25 degrees. Thus, top wall 51 is substantially horizontal except at elevated portions 57, where top wall 51 gradually rises and recedes in a direction longitudinally of the housing. The areas of juncture between top wall 51 and inclined sections 59, and between inclined sections 59 and flat section 58 are curved, thus eliminating any sharp corner between these sections. A discharge opening 60 is provided in each side wall 54 adjacent the extremity of the inclined portion 57 and straddling the transverse center line of the housing.

When a mower having the housing shown in Figs. 5, 6 and 7 is operated, the grass is cut and the grass cuttings are elevated and discharged through the discharge openings 60. Due to the fan-like operation caused by rotation of the rotary blade, air is caused to flow beneath the lower edge of the imperforate vertical cylindrical wall and upwardly within the housing and thereafter outwardly through openings 56. The grass cuttings are elevated and discharged through one of the openings 56. Any cuttings that are not discharged through one opening are carried around and discharged through the other opening. The provision of the elevated openings provides for the unobstructed movement of the grass cuttings upwardly and outwardly through each discharge opening. Accumulation or clogging which might be caused by grass cuttings which are not discharged through the one opening is avoided, since any cuttings which are not discharged out of one opening are carried around in the housing to the other opening.

I claim:

1. In a lawn mower, the combination comprising a housing, said housing having a generally imperforate top wall and a generally imperforate cylindrical side wall projecting downwardly from the top wall, said top wall having a substantially horizontal central portion and at least a portion thereof inclined gradually upwardly and outwardly in a radial direction from the periphery of said horizontal central portion to substantially the periphery of said top wall, said housing having a discharge opening therein at substantially the outward extremity of said inclined portion, and spaced vertically above the lower edge of said cylindrical side wall, the plane of said horizontal central portion lying intermediate the upper and lower edges of said opening, the radius of said cylindrical side wall being greater than the vertical distance between the plane of said central portion of the top wall and the outer extremity of said inclined portion of the top wall, a lawn mower blade, said central portion of the top wall having an aperture therein, means mounted on said top wall at said aperture for supporting said blade within said housing for rotation about a substantially vertical axis with the plane of rotation horizontal and adjacent the lower edge of said cylindrical wall, the inner diameter of said cylindrical wall being slightly greater than the length of said blade, the radius of said blade being greater than the vertical distance between the plane of rotation of said blade and the central portion of the top wall.

2. In a lawn mower, the combination comprising a housing, said housing having a generally imperforate cylindrical side wall projecting downwardly from the top wall, said top wall having a substantially horizontal central portion, the remainder of said top wall being generally flat and extending downwardly and outwardly from the periphery of the central portion toward the sides of the housing except for a pair of diametrically opposed elevated portions, each said elevated portion being inclined in a radial direction upwardly and outwardly toward the periphery of said top wall, said housing being provided with a discharge opening at substantially the extremity of each said elevated portion, said discharge opening being positioned above the lower edge of said cylindrical side wall of said housing, the plane of said horizontal central portion of said housing lying intermediate the upper and lower edges of said openings, the radius of said cylindrical side wall being greater than the vertical distance between the plane of said central portion and the extremities of said elevated portions, a lawn mower blade, said central portion of the top wall having an aperture therein, means mounted on said top wall and extending downwardly through said aperture for supporting said blade within said housing for rotation about a substantially vertical axis with the plane of rotation horizontal and adjacent the lower edge of said cylindrical wall, the inner diameter of said cylindrical wall being slightly greater than the length of said blade, the radius of said blade being greater than the vertical distance between the plane of rotation of said blade and the central portion of the top wall.

3. The combination set forth in claim 2, wherein said housing is symmetrical about a vertical radial plane bisecting said discharge openings.

4. The combination set forth in claim 3 wherein each said elevated portion includes a substantially flat central section which is generally horizontal in circumferential cross section and sections inclined in a circumferential direction and connecting said flat section with the top wall of said housing, said latter inclined sections extending downwardly toward said top wall and forming a small acute angle with a horizontal plane.

5. In a lawn mower, the combination comprising a housing, said housing having a generally imperforate top wall and a generally imperforate cylindrical side wall projecting downwardly from the top wall, said top wall having a substantially horizontal central portion, the remainder of said top wall being uniformly inclined upwardly and outwardly in a radial direction from the periphery of said horizontal central portion to the upper edge of said cylindrical side wall, said housing having diametrically opposed discharge openings formed in the side wall above the lower edge of the side wall, the plane of said horizontal central portion of the top wall lying intermediate the upper and lower edges of said openings, the radius of said cylindrical side wall being greater than the vertical distance between the plane of said central portion and the periphery of said inclined portion of the top wall, a lawn mower blade, said central portion of the top wall having an aperture therein, means mounted on said top wall at said aperture for supporting said blade within said housing for rotation about a substantially vertical axis with the plane of rotation horizontal and adjacent the lower edge of said cylindrical wall, the inner diameter of said cylindrical wall being slightly greater than the length of said blade, the radius of said blade being greater than the vertical distance between the plane of rotation of said blade and the central portion of the top wall.

References Cited in the file of this patent

UNITED STATES PATENTS

| | | |
|---|---|---|
| 2,720,742 | Hilton | Oct. 18, 1955 |
| 2,726,503 | Phelps | Dec. 13, 1955 |
| 2,760,327 | Bovee | Aug. 28, 1956 |